United States Patent Office 3,274,208
Patented Sept. 20, 1966

3,274,208
PROCESSES FOR PREPARING 2-THIAZOLYL-BENZIMIDAZOLE COMPOUNDS
Robert E. Jones, North Muskegon, Mich., and George Gal, Summit, N.J., assignors to Merck & Co., Inc., Rahway, N.J., a corporation of New Jersey
No Drawing. Filed Aug. 30, 1965, Ser. No. 483,874
3 Claims. (Cl. 260—302)

This application is a continuation-in-part of application Serial No. 338,288 filed January 17, 1964, which application is in turn a division of application Serial No. 124,772 filed July 18, 1961, now abandoned.

This invention is concerned generally with a method of preparing 2-substituted benzimidazoles. More specifically, it relates to a method for making benzimidazoles substituted at the 2-position with a five-membered nitrogen- and sulfur-containing heterocyclic ring from an N-phenyl-hydroxyamidine derivative of a compound containing such ring.

According to the instant invention, it has now been found that benzimidazoles having at the 2-position a heterocyclic ring containing nitrogen and sulfur as hetero atoms, and having at the 5- and/or 6-positions a hydrogen, loweralkyl, loweralkoxy, phenoxy, loweralkylthio, phenylthio, halo, phenyl, halophenyl or thienyl group, may be conveniently obtained from reaction of an N-phenylhydroxyamidine derivative of the five-membered heterocycle, and an alkyl or aryl sulfonyl halide. This process may be pictured structurally as follows:

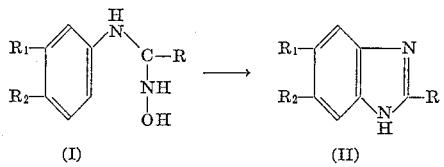

(I)            (II)

In the structures shown above, R represents a five-membered heterocyclic ring containing nitrogen and sulfur as the hetero atoms, e.g. thiazolyl, isothiazolyl or thiadiazolyl. When R is thiazolyl or isothiazolyl, the point of attachment to the benzimidazole nucleus in Formula II above and to the carbon atom of the amidine radical in Formula I above may be through any one of the three carbon atoms of the heterocyclic ring. When R is a thiadiazolyl group containing two nitrogen and one sulfur atoms in the ring, the point of attachment may be in either of the two carbon atoms in a 1,2,3-thiadiazole or a 1,2,4-thiadiazole. With the symmetrical 1,2,5-thiadiazoles, only one point of attachment, of course, exists.

$R_1$ and $R_2$ represent hydrogen or halo, for example chlorine or fluorine. One of $R_1$ and $R_2$ may be alkyl, preferably loweralkyl such as methyl, ethyl, isopropyl and the like, phenyl, or a halophenyl group having a halo radical, for example fluoro or chloro, located ortho, meta or para with respect to the phenyl carbon linking the halophenyl group to the benzimidazole moiety. Examples of such halophenyl groups include p-fluorophenyl, p-chlorophenyl, o-fluorophenyl, m-fluorophenyl, and the like. $R_1$ and $R_2$, but not both at any one time, also represent a heterocyclic radical such as thienyl and the like, a loweralkoxy or loweralkylthio group such as methoxy, ethoxy, methylthio, propylthio and the like, or a phenoxy or phenylthio group. Accordingly, $R_1$ and $R_2$ represent hydrogen, loweralkyl, loweralkoxy, loweralkylthio, phenoxy, phenylthio, halo, phenyl, halophenyl or thienyl, provided that when $R_1$ and $R_2$ are other than halo, at least one of $R_1$ and $R_2$ is hydrogen.

As will be appreciated by those skilled in this art, N-(substituted phenyl)-amidines substituted at the 3- and/or 4-positions with the substituents $R_1$ and $R_2$ will yield 5- and/or 6-substituted benzimidazoles having the Formula II above.

In accordance with this invention, the hydroxyamidine of Formula I is converted to a 2-substituted benzimidazole (Formula II) by treatment preferably at −10° C. to room temperature with an alkyl or aryl sulfonyl halide in the presence of a base such as pyridine or a trialkylamine, e.g. triethylamine, under anhydrous conditions. Suitable sulfonyl halides that may be employed are methane sulfonyl chloride, methane sulfonyl bromide, p-toluene sulfonyl chloride, p-toluene sulfonyl bromide, and the like. Thus, by reacting N-phenyl-(thiazole-4-hydroxyamidine) with methane sulfonyl chloride in the presence of a small amount pyridine, there is produced 2-(4′-thiazolyl)-benzimidazole. The benzimidazole is recovered from the reaction mixture by methods known to those skilled in the art. One convenient method is by crystallization from an acid solution at a pH of about 6.

The N-hydroxyamidine starting compounds of this invention are prepared by treating aniline or a substituted aniline and a cyano substituted five-membered heterocyclic ring containing nitrogen and sulfur and treating the resulting N-phenylamidine with hydroxylamine. More specifically, these starting materials are synthesized by intimately contacting a cyano derivative of the heterocyclic compound with aniline or a substituted aniline in the presence of a Friedel-Crafts type catalyst such as aluminum chloride, ferric chloride, zinc chloride, stannous chloride, aluminum bromide, zinc bromide, and the like. The reaction is conducted at temperatures in the range of 100–200° C. The reaction product is recovered as an acid addition salt. When the aniline compound contains a substituent at the 3- or 4-position (designated hereinabove as $R_1$ and $R_2$), such substituent survives the reaction and the N-phenylamidine is correspondingly substituted.

The N-phenylamidines are converted to the corresponding hydroxyamidines of Formula I by reaction with hydroxylamine. This conversion is brought about by intimately contacting the two reactants in a suitable solvent medium. Solvents such as aqueous alkanols are satisfactory. A sufficient amount of a base such as sodium carbonate, sodium bicarbonate or potassium carbonate is added in order to neutralize any free acid present in the reaction mixture. Formation of the hydroxyamidine may be carried out at elevated temperatures of from 75–150° C.

The 2-substituted benzimidazoles of Formula II hereinabove are highly efficacious in the treatment and prevention of helminthiasis in animals such as sheep, goats, cattle, horses and swine. When employed as anthelmintic agents, they are orally administered to the animals in the form of a drench or a bolus, or admixed with the feed of the animals.

The folowing examples are given for the purpose of illustration and not by way of limitation:

Example 1

42 mg. of methane sulfonyl chloride in 1 ml. of benzene is added dropwise at 5° C. to a mixture of 80 mg. of N-phenyl-(thiazole-4-hydroxyamide) in 3 ml. of benzene and 0.2 ml. of pyridine. The resulting mixture is allowed to stand at room temperature for 15 hours and the solid pyridine hydrochloride then removed by filtration. The filtrate is concentrated to dryness in vacuo and the resulting residue treated with 5 ml. of an 0.1 N sodium carbonate solution. The resulting solid is separated and dissolved in 2 ml. of 0.1 N hydrochloric acid. The acid solution is filtered and the pH then adjusted to 6 with ammonium hydroxide. 2 - (4′-thiazolyl)-benzimidazole precipitates and is recovered by filtration, washing with water, and drying in vacuo.

By similar treatment of N-phenyl-(thiazole-2-hydroxyamidine), N-phenyl-(isothiazole-4-hydroxyamidine), N-phenyl-(1,2,3-thiadiazole-4-hydroxyamidine), or N-3-methoxyphenyl-(thiazole-4-hydroxyamide), there are produced 2-(2'-thiazolyl)-benzimidazole, 2-(4'-isothiazolyl)-benzimidazole, 2-[4'-(1',2',3'-thiadiazolyl)]-benzimidazole, or 2-(4'-thiazolyl)-5-methoxy benzimidazole, respectively.

When the above process is carried out and N-3-ethylphenyl-(thiazole-4-hydroxyamide), N-3-fluorophenyl-(thiazole-4-hydroxyamidine), or N-4-biphenylyl-(thiazole-4-hydroxyamidine) is used in place of N-phenyl-(thiazole-4-hydroxyamidine), there is obtained 2-(4'-thiazolyl)-5-ethyl benzidimazole, 2-(4'-thiazolyl)-5-fluoro benzimidazole, or 2-(4'-thiazolyl)-5-phenyl benzimidazole, respectively.

*Example 2*

60 mg. of p-toluene sulfonyl bromide in 1.5 ml. of benzene is added dropwise at 10° C. to N-phenyl-(thiazole-2-hydroxyamidine) (0.1 g.) in 5 ml. of benzene and 0.3 ml. of triethylamine. The resulting mixture is maintained at room temperature for 20 hours. The triethylamine hydrobromide formed is filtered off and the filtrate is evaporated in vacuo. The residue is treated with 5 ml. of 0.1 N sodium carbonate and the resulting solid is separated and dissolved in 3 ml. of 0.1 hydrochloric acid. The acid solution is filtered, and the pH of the filtrate adjusted to 6 with ammonium hydroxide to precipitate 2-(2'-thiazolyl)-benzimidazole.

When the above process is carried out and N-3-methylthiophenyl-(thiazole-4-hydroxyamidine), N-4-(4'-fluorobiphenylyl)-(thiazole-4-hydroxyamidine), N-3-phenoxyphenyl-(thiazole-4-hydroxyamidine), N-3-phenylthiophenyl-(thiazole-4-hydroxyamidine), or N-3-(3'-thienylphenyl)-(thiazole-4-hydroxyamidine) is used in place of N-phenyl-(thiazole-2-hydroxyamidine), there is obtained 2-(4'-thiazolyl)-5-methylthio benzimidazole, 2-(4'-thiazolyl)-5-(4'-fluorophenyl)-benzimidazole, 2-(4'-thiazolyl)-5-phenoxy benzimidazole, 2-(4'-thiazolyl)-5-phenylthio benzimidazole, or 2-(4'-thiazolyl)-5-(3'-thienyl)-benzimidazole, respectively.

*Example 3*

The heterocyclic nitriles useful in preparing the N-phenylhydroxyamidine starting materials of this invention are prepared from the heterocyclic carboxylic acids by the procedure exemplified below:

60 g. of dry thiazole-4-carboxylic acid is added with stirring to 146 ml. of thionyl chloride. The reaction mixture is heated under gentle reflux for 2 hours. The excess thionyl chloride is then removed in vacuo, and 300 ml. of petroleum ether added slowly to the oily residue. The resulting mixture which contains precipitated thiazole-4-carboxylic acid chloride is cooled to 15° C., and the desired acid chloride removed by filtration. It is washed with cold petroleum ether and dried in vacuo; M.P. 85° C.

Approximately 14 g. of dry ammonia gas is added to a solution of 40 g. of thiazole-4-carboxylic acid chloride in 300 ml. of benzene over a period of 1 hour. The temperature is maintained at 30–35° C. The reaction mixture is then aged for 1 hour at 25° C. The solid product is removed by filtration and dried in vacuo. It is suspended in 130 ml. of cold water to dissolve ammonium chloride. The suspension is filtered and washed with cold water. The wet solid is then dissolved in 150 ml. of boiling water, the solution treated with decolorizing charcoal, filtered while hot and cooled to 5° C. The crystalline thiazole-4-carboxamide thus obtained is recovered by filtration and dried in vacuo at 40° C.; M.P. 152–153° C.

24 g. of thiazole-4-carboxamide and 20 g. of phosphorus pentoxide are intimately mixed in a round bottomed flask fitted with a short condenser and a receiver. The mixture is heated in an oil bath at a temperature of 200–220° C. for 20 minutes. The mixture is then distilled, 4-cyanothiazole distilling at 100–120° C./20 mm. The product is purified by sublimation (65° C./30 mm.); M.P. 60–61° C.

*Example 4*

3.0 g. of 4-cyanothiazole (0.0275 mole) is added to 2.75 g. of aniline at 25° C., and 3.65 g. (0.0275 mole) of powdered aluminum chloride gradually stirred into the mixture over a period of 20 minutes. An exothermic reaction ensues and the temperature of the reaction mixture rises to about 120–130° C. After the addition of aluminum chloride is complete, the reaction mixture is heated at 180° C. for 20 minutes. It is then cooled to room temperature and the reaction mass dissolved in 100 ml. of 75% ethanol. The resulting solution is made strongly alkaline with 25% aqueous sodium hydroxide solution and then extracted with 3 x 70 ml. of chloroform. The chloroform extracts are combined, washed with water, and dried over potassium carbonate. The chloroform solution is filtered and treated with 1.0 g. of decolorizing charcoal. The charcoal is removed by filtration and the charcoal treatment repeated once more. The resulting yellow solution is concentrated to dryness in vacuo and the residue dissolved in 25 ml. of isopropanol. The pH of the solution is adjusted to 1–1.5 with isopropanolic hydrogen chloride and 500 ml. of ether added slowly, with stirring, at about 10° C. After addition of ether is complete, the mixture is stirred for 1 hour and the resulting solid removed by filtration. The solid is washed with small portions of ether and petroleum ether and then dried in vacuo at 25° C. to give 5.7 g. of N-phenyl-(thiazole-4-amidine) hydrochloride, M.P. 255–257° C.

When the above process is carried out and 4-cyanothiazole or aniline is replaced by an appropriate heterocyclic nitrile or an appropriately substituted aniline, respectively, any desired N-phenylamidine intermediate may be prepared.

*Example 5*

To a solution of 1.05 g. of hydroxylamino hydrochloride in 9 ml. of water there is added 2.39 g. (0.01 mole) of N-phenyl-(thiazole-4-amidine) hydrochloride, followed by 9 ml. of ethanol. 840 mg. of sodium bicarbonate is then added and the reaction mixture stirred for 10–15 minutes in an oil bath at a temperature of 95° C. The solution is then cooled to room temperature and an additional 840 mg. of sodium bicarbonate is added. Following the second addition, the reaction mixture is stirred at 20–25° C. for 10 minutes. It is then diluted with 20 ml. of water and extracted with 3 x 25 ml. of chloroform. The chloroform extracts are combined, washed with 10 ml. of water and dried over magnesium sulfate. The organic solvent solution is filtered and concentrated to dryness in vacuo. The oily residue is triturated with petroleum ether in order to crystallize the N-phenyl-(thiazole-4-hydroxyamidine). This amidine is recovered by filtration and dried in vacuo. It is recrystallized from water to give substantially pure material, M.P. 142–145° C.

When N-phenyl-(thiazole-4-amidine) hydrochloride is replaced by an appropriate heterocyclic derivative of N-phenylamidine hydrochloride, each of the N-phenylhydroxyamidine starting materials of this invention may be prepared.

Examples 3–5 are intended for the purpose of disclosing methods generally applicable in preparing starting materials and are not within the scope of this invention.

Any departure from the above description which conforms to the present invention is intended to be included within the scope of the claims.

What is claimed is:

1. The process for making a 2-substituted benzimidazole of the formula

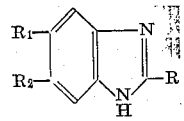

where R is a thiazolyl, thiadiazolyl or isothiazolyl ring, the point of attachment of said ring to the benzimidazole nucleus being at a carbon atom of said heterocyclic ring, and $R_1$ and $R_2$ are hydrogen, loweralkyl, loweralkoxy, loweralkylthio, phenoxy, phenylthio, halo, phenyl, halophenyl or thienyl, provided that when both $R_1$ and $R_2$ are other than halo, at least one of $R_1$ and $R_2$ is hydrogen, that comprises treating a compound of the formula

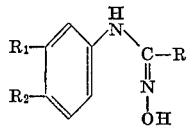

where R, $R_1$ and $R_2$ are as defined above, with an alkyl or aryl sulfonyl halide in the presence of a base.

2. The process for making 2-(4'-thiazolyl)-benzimidazole that comprises intimately contacting N-phenyl-(thiazole-4-hydroxyamidine) with a lower alkyl sulfonyl halide in the presence of a pyridine.

3. The process for making 2-(2'-thiazolyl)-benzimidazole that comprises intimately contacting N-phenyl-(thiazole-2-hydroxyamidine) with a loweralkyl sulfonyl halide in the presence of a pyridine.

No references cited.

ALEX MAZEL, *Primary Examiner.*

ALTON D. ROLLINS, *Assistant Examiner.*